United States Patent [19]

Inaba et al.

[11] Patent Number: 5,175,048

[45] Date of Patent: Dec. 29, 1992

[54] MAGNETIC RECORDING MEDIUM

[75] Inventors: Hiroo Inaba; Masatoshi Takahashi; Kazuaki Taga, all of Kanagawa, Japan

[73] Assignee: Fuji Photo Film Co., Ltd., Kanagawa, Japan

[21] Appl. No.: 765,740

[22] Filed: Sep. 26, 1991

[30] Foreign Application Priority Data

Sep. 27, 1990 [JP]  Japan .................................. 2-258533

[51] Int. Cl.$^5$ ............................................ G11B 23/00
[52] U.S. Cl. .................................. 428/213; 428/323; 428/329; 428/336; 428/694; 428/900
[58] Field of Search ............... 428/329, 694, 900, 336, 428/213, 323

[56]  References Cited

U.S. PATENT DOCUMENTS

| | | | |
|---|---|---|---|
| 4,075,384 | 2/1978 | Suzuki et al. | 428/900 |
| 4,410,590 | 10/1983 | Kawahara et al. | 428/694 |
| 4,506,000 | 3/1985 | Kubota et al. | 428/694 |
| 4,844,946 | 7/1989 | Komatsu et al. | 428/336 |
| 4,847,147 | 7/1989 | Aonuma et al. | 428/336 |
| 4,851,289 | 7/1989 | Ogawa et al. | 428/694 |
| 4,965,120 | 10/1990 | Ono et al. | 428/900 |
| 5,043,212 | 8/1991 | Ando et al. | 428/900 |
| 5,051,303 | 9/1991 | Noguchi et al. | 428/694 |

Primary Examiner—Paul J. Thibodeau
Assistant Examiner—Leszek Kiliman
Attorney, Agent, or Firm—Sughrue Mion Zinn Macpeak & Seas

[57] ABSTRACT

A magnetic recording medium comprising a non-magnetic support having at least two magnetic layers formed thereon, the at least two magnetic layers being formed by providing, in sequence, a first magnetic layer containing first ferromagnetic powder and a first binder on a surface of the non-magnetic support and then providing a second magnetic layer containing a second binder and second ferromagnetic powder while the first layer is in a wet state, the first magnetic layer containing the first binder in an amount of 10 to 27 parts by weight based on 100 parts by weight of the first ferromagnetic powder, the second magnetic layer containing the second binder in an amount of 14 to 30 parts by weight based on 100 parts by weight of the second ferromagnetic powder, the amount of the first binder contained in the first magnetic layer being smaller than that of the second binder contained in the second magnetic layer with a difference therebetween being from 0.5 to 10 parts by weight, and a ratio (A/B) of a dry thickness (A) of the first magnetic layer to a dry thickness (B) of the second magnetic layer being from 0.5 to 3.2. The magnetic recording medium is excellent in electromagnetic conversion characteristics and running stability.

10 Claims, No Drawings

MAGNETIC RECORDING MEDIUM

FIELD OF THE INVENTION

The present invention relates to a magnetic recording medium, and more particularly to a magnetic recording medium having at least two magnetic layers which demonstrates excellent electromagnetic characteristics and running stability.

BACKGROUND OF THE INVENTION

With increased requirements in recording density in recent years, magnetic recording media have been demanded that employ ferromagnetic powder that is finer in particle size and which have magnetic layers which are higher in surface smoothness. However, such finer ferromagnetic powder and smoother magnetic layer surfaces result in an increase in the coefficient of friction of the magnetic layer surfaces. As a consequence, it becomes difficult to improve running durability and running stability without adversely affecting wow and flutter characteristics.

For a conventional plural magnetic layer coating, sequential coating has been mainly employed. Typically, improvements in the S/N ratio and the output have been made by reducing the particle size of ferromagnetic powder contained in a second magnetic layer (an upper layer).

However, when the particle size of the ferromagnetic powder contained in the upper layer is reduced, the dropping off of powder from the magnetic layer (powder dropping) is liable to take place, which causes clogging and hinders running. Further, the $\mu$ value (coefficient of friction) of the magnetic layer is increased which tends to introduce a problem also for running stability.

Many headphone stereos have come to be used for audio cassettes. The cassette players for these mobile systems are minimum reproducers for reproduction capability only typically which are very convenient to transport or carry. However, the consumption power is reduced to permit miniaturization of the reproducers. As a result, the cassette players/reproducers are weaker in transfer power than conventional recorders for audio cassettes which, as a result, are susceptible to increase in wow and flyutter. Magnetic recording media having better running stability than conventional magnetic recording media have been desired to offset such disadvantages associated with the miniaturized players.

In this regard, it is effective to incorporate a large amount of carbon black in the second magnetic layer (the upper layer) to improve running stability. However, an increase in the amount of the particles contained in the upper layer introduces or aggravates the problem of powder dropping during running.

In order to avoid such a powder dropping problem, one approach has been to increase the amount of a binder contained in the upper layer, as described in JP-A-58-56228, JP-A-58-56230 and JP-A-54-48504 (the term "JP-A" as used herein means an "unexamined published Japanese patent application").

However, in the case of sequential coating, if the amount of the binder contained in the upper layer is increased, a clear and distinct interface is formed between the upper and lower layers which are largely different from each other in binder amount distribution. For this reason, internal strain is created and retained in the magnetic layers. As a result, the upper magnetic layer containing the binder in a larger amount contracts strongly.

The retaining of strain in the magnetic layers leads to easy separation of the upper magnetic layer in repeated running and aggravation of the problem of powder dropping. Further, the magnetic layers markedly curled or warped, which makes it impossible to ensure stable contact with a head.

Namely, for the audio tape obtained by the conventional sequential coating procedure in general, the second magnetic layer (the upper layer) is coated after completing the hardening of the first magnetic layer (the lower layer) has been completed. As a result, a clear and distinct interface also appears between the magnetic layers, which are usually largely different from each other in binder amount distribution, and internal strain is therefore developed in the magnetic layers. In extreme cases, the phenomenon that the second magnetic layer is separated from the first magnetic layer is observed, and abnormalities such as clogging sometimes occur during running. Even when the separation does not take place, the tape is markedly curled, which often makes it impossible to maintain suitable contact with the head.

In order to solve the problems associated with the sequential coating procedure described above, simultaneous plural-layer coating, or wet-on-wet coating, has recently been developed. For example, the kind of binders and the amount of functional groups contained in the binders are adjusted to ameliorate deterioration of running durability due to a reduction in the particles size of ferromagnetic powder contained in upper layers, as described, for example, in JP-A-63-146211, JP-A-63-146209, JP-A-63-146210, JP-A-63-261529 and JP-A-63-261530.

In such a wet-on-wet coating method, an embodiment, in which the amount of binders contained in upper and lower layers is specified, is disclosed in JP-A-2-101627. A magnetic recording medium described therein is designed for video cassettes. The medium comprises a non-magnetic support having thereon a first magnetic layer and a second magnetic layer in that order, the second magnetic layer being formed while the first magnetic layer is still in a wet state, and each of the first and second magnetic layers containing a vinyl chloride resin or a cellulose resin as a part of a binder, and a ratio $((A/C-1) \times 100)$ of a total amount (A) of the binder contained in the first magnetic layer based on the amount of a ferromagnetic powder contained in the first magnetic layer to a total amount (C) of the binder contained in the second magnetic layer based on the amount of ferromagnetic powder contained in the second magnetic layer being $\pm 5\%$ to $\pm 20\%$.

However, the magnetic recording medium designed for video cassettes are different from the magnetic recording media used for audio cassettes in design principle. It is not typically possible to interchange the former for the latter. Namely, for magnetic recording medium video cassettes, the problem of curling is not encountered, because the first magnetic layer is relatively thin. On the other hand, the media for video cassettes are not satisfactory in electromagnetic characteristics for recording of long wavelength such as typical to an audio tape, because the first magnetic layer is thin, and has the particular disadvantage that the output, the MOL, at 10 kHz decreases, as associated with the use of the same binder in the first layer and the second layer. In recent years, an improvement in quality of a high tone has been required in audio tapes, and a reduction in output at 10 kHz has been a serious problem.

SUMMARY OF THE INVENTION

It is therefore an object of the present invention to provide a magnetic recording medium excellent in electromagnetic characteristics and running stability, and particularly a magnetic recording medium improved in running stability in tape decks having weak transfer power such as headphone stereos, and also improved in electromagnetic characteristics in the region of long wavelength.

The present invention relates to a magnetic recording medium comprising a non-magnetic support having at least two magnetic layers formed thereon, the at least two magnetic layers being formed by providing, in sequence, a first magnetic layer (a lower layer) containing first ferromagnetic powder and a first binder on a surface of the non-magnetic support and then providing a second magnetic layer (an upper layer) containing a second binder and second magnetic powder while the first magnetic layer is in a wet state, in which the first magnetic layer (the lower layer) contains the first binder in an amount of 10 to 27 parts by weight based on 100 parts by weight of the first ferromagnetic powder in the lower layer, the second magnetic layer (the upper layer) contains the second binder in an amount of 14 to 30 parts by weight based on 100 parts by weight of the second ferromagnetic powder in the upper layer, the amount of the first binder contained in the first magnetic layer (the lower layer) is smaller than that of the second binder contained in the second magnetic layer (the upper layer) with a difference therebetween being from 0.5 to 10 parts by weight, and a ratio (A/B) of a dry thickness (A) of the first magnetic layer to a dry thickness (B) of the second magnetic layer is 0.5 to 3.2.

DETAILED DESCRIPTION OF THE INVENTION

The amount of the first binder in the first magnetic layer is preferably 13 to 25 parts by weight, and more preferably 15 to 23.5 parts by weight, based on 100 parts by weight of the first ferromagnetic powder. The amount of the second binder in the second magnetic layer is preferably 15 to 28 parts by weight, and more preferably 16 to 25 parts by weight, based on 100 parts by weight of the second ferromagnetic powder. The difference between the amounts of the ferromagnetic powder in the first magnetic layer and that in the second magnetic layer is preferably 1 to 7 parts by weight, and more preferably 1 to 5 parts by weight. The ratio of the dry thickness of the first magnetic layer and that of the second magnetic layer is preferably 0.6 to 3.0, and more preferably 0.8 to 2.5.

In a more preferred embodiment of the present invention, a magnetic recording medium is provided, in which the second binder contained in the second magnetic layer contains a —OH or —COOM group (wherein M represents hydrogen or an alkaline metal, preferably Na or K), and the first binder contained in the first magnetic layer contains $-N^{\oplus}R_3X^{\ominus}$, $-SO_3M$, $-OSO_3M$, $-PO_3M_2$ or $-OPO_3M_2$ (wherein R represents an alkyl group or hydrogen, preferably $CH_3$ or H, X represents an anion, preferably $Cl^-$ or $Br^-$, and M represents hydrogen or an alkaline metal, preferably Na or K), and the dry thickness of the second magnetic layer is 1 to 3 μm.

In the present invention, a binder having a high dispersibility is used in relatively small amounts in the first magnetic layer in order to heighten the packing degree and the dispersibility of the ferromagnetic powder, and particularly to improve the output at 10 kHz affecting the quality of low tone reproduction. Further, a binder having suitable dispersibility is used in relatively large amounts in the second magnetic layer so that the particles are prevented from the dropping off and the level down after running is improved. The surface of the magnetic layer has suitable surface unevenness and the μ value is reduced, thereby preventing wow and flutter. Moreover, the simultaneous or wet-on-wet coating technique is employed in the present invention. Consequently, the curling problem does not take place even when the second magnetic layer is relatively thick.

When the second magnetic layer is provided with a thickness for which the ratio (A/B) (representing the dry thickness (A) of the first magnetic layer/the dry thickness (B) of the second magnetic layer) is in the range of 0.5 to 3.2 and the resulting layered structure is suitable for use as a magnetic recording media for audio reproduction, the use of conventional sequential coating produces a clear interfacial boundary between the magnetic layers and the tape is liable to be curled. However, in the present invention, the second magnetic layer and any subsequently applied layers thereover are formed in sequence in a wet-on-wet state after the first magnetic layer has been formed, whereby the concentration of the binder is continuously changed at the interface(s). For this reason, the curling can be prevented. Further, the particles can be prevented from the dropping off and the level down after running can be improved by increasing the amount of the binder contained in the second magnetic layer. Also, the MOL 10k is significantly improved by specifying the above-described A/B ratio to 0.5 to 3.2.

In the present invention, it is preferred that the binder used in the first magnetic layer contains a polar group such as $-N^{\oplus}R_3X^{\ominus}$, $-SO_3M$, $-OSO_3M$, $-PO_3M_2$ or $-OPO_3M_2$ (with R, X and M as defined above), thereby improving dispersibility. Further, the packing degree is improved by reducing the amount of the binder in the first magnetic layer. Thereby, the MOL 10k is markedly improved.

On the other hand, a binder having an —OH group or a —COOH group is used in the second magnetic layer, so that the dispersibility is not inordinately increased. The binder in the second magnetic layer is used in relatively large amounts, and therefore the packing degree is not increased while providing suitable flexibility and good running properties. Further, the binder having relatively low dispersibility is used in the second magnetic layer. Suitable unevenness is therefore formed on the surface of the magnetic layer and the μ value decreases, whereby the wow and flutter can be prevented.

More preferably, an excellent magnetic recording medium for audio reproduction applications can be obtained by forming the second magnetic layer with a thickness of 1 to 3 μm.

The groups $-N^{\oplus}R_3X^{\ominus}$, $-SO_3M$, $-PO_3M_2$ and the like polar groups of the binders used in the first magnetic layer are strong in basicity or acidity, so that they tend to be firmly adsorbed by basic active points or acidic active points of the ferromagnetic powder, whereby the dispersibility of the ferromagnetic powder can be improved. On the other hand, —OH and —COOM groups of the binders used in the second magnetic layer do not have very strong affinity to ferromagnetic powder, and therefore, these groups are not firmly adsorbed by the ferromagnetic powder. However, these groups serve to give suitable softness to the binders.

Other preferred embodiments of the present invention include the following:

(1) The magnetic recording medium in which the thickness of the first magnetic layer is preferably 1.5 to 5 μm, and more preferably 2 μm or more and less than 4 μm.

(2) The magnetic recording medium in which the thickness of the second magnetic layer is preferably 1.0 to 3 μm, and more preferably 1.5 to 2.6 μm.

(3) The magnetic recording medium in which the ferromagnetic powder contained in the first magnetic layer preferably has a specific surface area of 50 m$^2$/g or less as measured by the BET method and a crystallite size of 200 Å or more, and more preferably has a specific surface area of 40 m$^2$/g or less and a crystallite size of 210 Å or more.

(4) The magnetic recording medium in which the ferromagnetic powder contained in the second magnetic layer preferably has a specific surface area of 25 to 80 m$^2$/g as measured by the BET method and a crystallite size of 450 to 100 Å, and more preferably has a specific surface area of 35 to 60 m$^2$/g and a crystallite size of 150 to 350 Å.

(5) The magnetic recording medium in which the binder used in the first magnetic layer contains vinyl chloride or vinyl acetate, and —NR$_3$X as a polar group wherein R represents an alkyl group and X represents an anion.

(6) The magnetic recording medium in which γ-Fe$_2$O$_3$ or Co-modified γ-Fe$_2$O$_3$ having a coercive force (Hc) of 400 to 900 Oe is used as the ferromagnetic powder of the upper layer, γ-Fe$_2$O$_3$ or Co-modified γ-Fe$_2$O$_3$ having an Hc of 300 to 700 Oe is used as the ferromagnetic powder of the lower layer, the ferromagnetic powder of the upper layer is higher in Hc than that of the lower layer, and the difference in Hc therebetween is 100 to 300 Oe.

(7) The magnetic recording medium in which the upper layer has a residual magnetic flux density Br of 1,500 to 2,500 gausses, the lower layer has a Br of 1,700 to 2,800 gausses, the lower layer is higher in Br than the upper layer, and the difference in Br therebetween is 200 to 600 gausses.

(8) The magnetic recording medium in which the amount of carbon black contained in the first magnetic layer (the lower layer) is not more than 10 parts by weight based on 100 parts by weight of the ferromagnetic powder contained in the first magnetic layer, the amount of carbon black contained in the second magnetic layer (the upper layer) is at least 0.5 part by weight, the amount of carbon black contained in the second magnetic layer is larger than that contained in the first magnetic layer, and the difference therebetween is 0.5 part by weight or more.

The specific surface area measured by the BET method of ferromagnetic powder contained in the second magnetic layer according to the present invention is preferably 25 to 80 m$^2$/g, and more preferably 35 to 60 m$^2$/g. If the specific surface area is less than 25 m$^2$/g, noises tend to be unfavorably elevated, and if it exceeds 80 m$^2$/g, the surface properties tend to be unfavorably difficult to obtain. The magnetic particles contained in the second magnetic layer according to the present invention preferably have a crystallite size of 100 to 450 Å, and more preferably 150 to 350 Å.

On the other hand, with respect to other characteristics of the ferromagnetic powder contained in the first magnetic layer according to the present invention, it is preferred that the particle size (major axis) and the crystalline size are larger than those of the ferromagnetic powder contained in the second magnetic layer and that the specific surface area is smaller than that of the ferromagnetic powder contained in the second magnetic layer, because the ferromagnetic powder is generally easily dispersed, whereby the excellent surface properties are obtained.

When the magnetic characteristics of the magnetic recording medium of the present invention are measured in a magnetic field of 5 KOe, the squareness ratio of the second magnetic layer in the running direction of the tape is generally 0.70 or more, preferably 0.80 or more, and more preferably 0.90 or more. The squareness ratio of the first magnetic layer may be smaller than that of the second magnetic layer, but it is preferably 0.80 or more.

The higher the squareness ratio of the second magnetic layer is, the more easily a switching field distribution (SFD) of 6 or less is attained for the second magnetic layer.

The squareness ratio of the first magnetic layer and the second magnetic layer in two directions perpendicular to the running direction of the tape is preferably not more than 80% of the angular ratio in the running direction of the tape.

The SFD of the first magnetic layer may be larger than that of the second magnetic layer, but it is preferably not more than 0.6.

The saturation magnetization (σs) of the ferromagnetic powder contained in the second magnetic layer is generally at least 50 emu/g, and preferably at least 70 emu/g. In the case of fine ferromagnetic metal powders, it is preferably at least 100 emu/g. The saturation magnetization (σs) of the first magnetic layer may be smaller than that of the second magnetic layer, but it is preferably 50 emu/g or more.

The r1500 of the ferromagnetic powder contained in the second magnetic layer is preferably lower than that of the ferromagnetic powder contained in the first magnetic layer, but may be higher as long as it is 1.5 or less. It is preferred that both the ferromagnetic powder contained in the first magnetic layer and that contained in the second magnetic layer have an r1500 of 1.0 or less.

The r1500 indicates the percentage of the amount of the magnetized ferromagnetic powder remaining without being reversed when a magnetic field of 1,500 Oe is applied to the magnetic recording medium in the opposite direction after the saturation magnetization thereof.

For both the first magnetic layer and the second magnetic layer, the water content of the ferromagnetic powder is preferably 0.01 to 2%. It is preferred that the water content of the ferromagnetic powder is optimized depending on the type of the selected binder.

The tap density of the ferromagnetic powder contained in the second magnetic layer is preferably 0.5 g/cc or more, and more preferably 0.8 g/cc or more. The tap density of the ferromagnetic powder contained in the first magnetic layer may be lower than that of the ferromagnetic powder contained in the second magnetic layer, but it is preferably 0.6 g/cc or more.

When the ferromagnetic powder contained in the first magnetic layer is composed of cobalt-modified iron oxide, the ratio of divalent iron to trivalent iron is preferably 0 to 20 atomic %, and more preferably 5 to 10 atomic %. The amount of iron atoms is generally 0 to 15% based on the amount of cobalt atoms, and preferably 3 to 8%.

It is preferred that the pH of the ferromagnetic powder contained in the first magnetic layer and that contained in the second magnetic layer is optimized depending on the particular binder combination used. The range of the pH is generally 4 to 12, and preferably 6 to 10.

At least one of the ferromagnetic powder contained in the first magnetic layer and that contained in the second magnetic layer may be surface treated with Al, Si, P or oxides thereof if desired. The amount thereof is 0.1 to 10% based on the ferromagnetic powder. The adsorption amount of lubricants such as fatty acids is preferably reduced to 100 mg/m² or less by the surface treatment.

In some cases, both the ferromagnetic powder of the first magnetic layer and that of the second magnetic layer contain soluble inorganic ions such as Na, Ca, Fe, Ni and Sr. However, these ions do not particularly affect the magnetic layer characteristics as long as their content is not more than 500 ppm.

Examples of the ferromagnetic powder that can be used in the first magnetic layer and the second magnetic layer in the present invention include conventional ferromagnetic powder such as $\gamma$-FeO" (x: 1.33-1.5), Co-modified $\gamma$-FeO$_x$ (x: 1.33-1.5), a fine ferromagnetic alloy powder containing at least 75 atomic % of Fe, Ni or Co, barium ferrite and strontium ferrite. These ferromagnetic powder may contain atoms such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B, in addition to the above-mentioned atoms.

These ferromagnetic powder can be pretreated with dispersants, lubricants, surface active agents, antistatic agents or the like, which will hereinafter be described, prior to their dispersion.

Of the above-described ferromagnetic powder, the fine ferromagnetic alloy powder may contain small amounts of hydroxides or oxides. The fine ferromagnetic alloy powder obtained by conventional methods can be used. Such methods include the following methods:

(1) A method in which a complex organic acid salt (mainly an oxalic acid salt) is reduced with a reducing gas such as hydrogen;

(2) A method in which iron oxide is reduced with a reducing gas such as hydrogen to obtain Fe or Fe-Co particles;

(3) A method in which a metal carbonyl compound is thermally decomposed;

(4) A method in which a reducing agent such as sodium borohydride, a hypophosphite or hydrazine is added to an aqueous solution of a ferromagnetic metal to conduct reduction; and (5) A method in which a metal is evaporated in a low-pressure inert gas to obtain a fine powder.

The fine ferromagnetic alloy powder thus obtained may be subjected to a conventional gradual-oxidizing methods such as a method in which the ferromagnetic alloy powder is immersed in an organic solvent, followed by drying, a method in which the ferromagnetic alloy powder is immersed in an organic solvent, and then an oxygen-containing gas is introduced therein to form oxide films on the surfaces of the particles, followed by drying, and a method in which the partial pressures of an oxygen gas and an inert gas are controlled to form oxide films on the surfaces of the particles, without using an organic solvent.

It is preferred that the ferromagnetic powder used in the present invention has few pores. The percentage of pores is preferably 20% by volume or less, and more preferably 5% by volume or less.

The ferromagnetic powder used in the present invention can be produced by conventional methods. The shape thereof may be any of acicular, granular, ellipsoidal and tabular forms, as long as the above-described characteristics for particle size are fulfilled.

In order to attain an SFD of 0.6 or less for the second magnetic layer according to the present invention, it is necessary to minimize the Hc distribution of the ferromagnetic powder. For this purpose, there is employed the method of improving the size distribution of goethite, the method of preventing $\gamma$-hematite from sintering, or the method of slowing down the adhering rate of cobalt compared to the conventional rate for Co-modified iron oxide.

In the present invention, known thermoplastic resins, thermosetting resins, reactive resins and mixtures thereof can be used in both the first magnetic layer and the second magnetic layer as the binders.

The thermoplastic resins include resins having a glass transition temperature of $-100°$ to 150° C., a number average molecular weight of 1,000 to 200,000, preferably 10,000 to 100,000 and a degree of polymerization of about 50 to 1,000.

Examples of such resins include polymers and copolymers containing vinyl chloride, vinyl acetate, vinyl alcohol, maleic acid, acrylic acid, an acrylate, vinylidene chloride, acrylonitrile, methacrylic acid, a methacrylate, styrene, butadiene, ethylene, vinyl butyral, vinyl acetal and vinyl ether as a structure unit; polyurethane resins; and various rubber resins.

The thermosetting resins or the reactive resins include phenolic resins, epoxy resins, hardenable polyurethane resins, urea resins, melamine resins, alkyd resins, reactive acrylic resins, formaldehyde resins, silicone resins, epoxy-polyamide resins, mixtures of polyester resins and isocyanate prepolymers, mixtures of polyester polyols and polyisocyanates, and mixtures of polyurethanes and polyisocyanates.

These resins are described in detail in *Plastic Handbook* published by Asakura Shoten, Japan (1980).

It is also possible to use known resins of an electron beam hardening type in the first magnetic layer or the second magnetic layer. Examples of these resins and methods for producing them are described in detail in JP-A-62-256219.

The resins described above can be used alone or in combination. Preferred examples include combinations of resins of at least one kind selected from the group consisting of vinyl chloride resins, vinyl chloride-vinyl acetate resins, vinyl chloride-vinyl acetate-vinyl alcohol resins and vinyl chloride-vinyl acetate-maleic anhydride copolymers, with polyurethane resins, and combinations of these combined resins with further polyisocyanate resins.

Conventional polyurethane resins such as polyester-polyurethanes, polyetherpolyurethanes, polyether-polyesterpolyurethanes, polycarbonatepolyurethanes, polyesterpolycarbonatepolyurethanes and polycaprolactonepolyurethanes can be used.

For all the binders described herein, in order to obtain more excellent dispersibility and durability, it is preferred to introduce therein at least one polar group selected from the group consisting of —COOM, —SO$_3$M, —OSO$_3$M, —P=O(OM)$_2$, —O—P=O(OM)$_2$ (wherein M represents hydrogen or an alkaline metal salt group), —OH, —NR$_2$, —N$^+$R$_3$ (wherein R represents a hydrocarbon group), an epoxy group, —SH and —CN, using copolymerization or addition reaction as needed. The content of such a polar group is $1 \times 10^{-1}$ to $1 \times 10^{-8}$ mol/g, and preferably $1 \times 10^{-2}$ to $1 \times 10^{-6}$. The second magnetic layer can contain —OH or —COOM, and the first magnetic layer can contain —SO$_3$M$_2$, —OSO$_3$M$_2$, —PO$_3$M$_2$, —OPO$_3$M$_2$ or —N$^{\oplus}$R$_3$X$^{\ominus}$.

Specific examples of these binders used in the present invention include VAGH, VYHH, VMCH, VAGF, VAGD, VROH, VYES, VYNC, VMCC, XYHL, XYSG, PKHH, PKHJ, PKHC and PKFE (manufactured by Union Carbide Co.); MPR-TA, MPR-TA5, MPR-TAL, MPR-TSN, MPR-TMF, MPR-TS and MPR-TM (manufactured by Nissin Chemical Industry Co., Ltd.); 1000W, DX80, DX81, DX82 and DX83 (manufactured by Denki Kagaku Co., Ltd.); MR110, MR100 and 400X110A (manufactured by Nippon Zeon Co., Ltd.); Nippollan N2301, N2302 and N2303 (manufactured by Nippon Polyurethane Co., Ltd.); Pandex T-5105, T-R3080 and T-5201, Barnock D-400 and D-210-80, and Crisvon 6109 and 7209 (manufactured by Dainippon Ink and Chemicals, Inc.); Vylon UR8200, UR8300, RV530 and RV280 (manufactured by Toyobo Co., Ltd.); Daipheramin 4020, 5020, 5100, 5300, 9020, 9022 and 7020 (manufactured by Dainichiseika Co., Ltd.); MX5004 (manufactured by Mitsubishi Kasei Corp.); Sunprene SP-150 (manufactured by Sanyo Chemical Industries Co., Ltd.); and Salan F310 and F210 (manufactured by Asahi Chemical Industry Co., Ltd.).

When the vinyl chloride resin is used as the binder, it is preferably used in an amount of 5 to 30% by weight, and when the polyurethane resin is used, it is preferably used in an amount of 2 to 20% by weight. It is preferred that the polyisocyanate resin is used in an amount of 2 to 20% by weight in combination with these resins.

When the polyurethane resins are used in the present invention, polyurethane resins are preferably used having a glass transition temperature of —50 to 100° C., a breaking elongation of 100 to 2,000%, a breaking stress of 0.05 to 10 kg/cm$^2$ and a yield point of 0.05 to 10 kg/cm$^2$.

The magnetic recording medium of the present invention comprises at least two magnetic layers. It is therefore possible, of course, to vary many parameters between the first magnetic layer and the second magnetic layer, such as the amount of the binder, the amount of the vinyl chloride resin, the polyurethane resin, the polyisocyanate resin or the other resins contained in the binder, the molecular weight or the amount of the polar groups of each resin forming the magnetic layer, and the physical characteristics of the above-described resins, as required.

The polyisocyanates which can be used in the present invention include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate; reaction products of these isocyanates with polyalcohols; and polyisocyanates formed by condensation of isocyanates. These isocyanates are commercially available under the trade names of Coronate L, Coronate HL, Coronate 2030, Coronate 2031, Millionate MR and Millionate MTL (manufactured by Nippon Polyurethane Co., Ltd.); Takenate D-102, Takenate D-110N, Takenate D-200 and Takenate D-202 (manufactured by Takeda Chemical Industries, Ltd.); and Desmodule L, Desmodule IL, Desmodule N and Desmodule HL (manufactured by Sumitomo Bayer Co., Ltd.). These polyisocyanates can be used alone or in combinations of two or more in both the first magnetic layer and the second magnetic layer, utilizing the difference in hardening reactivity.

Examples of carbon black used in the present invention include furnace black for rubbers, thermal black for rubbers, black for coloring and acetylene black. It is preferred that the carbon black has a specific surface area of 5 to 500 m$^2$/g, an oil adsorption as measured by the DBP method of 10 to 400 ml/100 g, a particle size of 5 to 300 mµ, a pH of 2 to 10, a water content of 0.1 to 10% by weight and a tap density of 0.1 to 1 g/cc.

Specific examples of the carbon black used in the present invention include BLACKPEARLS 2,000, 1,300, 1,000, 900, 800 and 700, and VULCAN XC-72 (manufactured by Cabot Co.); #80, #60, #55, #50 and #35 (manufactured by Asahi Carbon Co., Ltd.); #2400B, #2300, #900, #1,000, #30, #40 and #10B (manufactured by Mitsubishi Kasei Corp.); and CONDUCTEX SC, RAVEN 150, 50, 40 and 15 (manufactured by Colombia Carbon (Co.). The carbon black which is surface treated with a dispersing agent, which is grafted with a resin, or whose surface is partly graphitized may be used. Further, the carbon black may be previously dispersed with a binder before the carbon black is added to a magnetic coating composition.

The carbon black can be used alone or in combinations thereof in either the first and second magnetic layers.

The carbon black serves to provide antistatic property in the magnetic layers, to reduce the coefficient of friction, to give shading property and to increase film strength. These functions vary depending on the kind of carbon black used. It is therefore possible, of course, that the carbon black is properly used in the first magnetic layer and the second magnetic layer by changing the kind, amount and combination of carbon black used, based on various characteristics described above such as particle size, oil absorption amount, electric conductivity and pH, according to the purpose. For example, carbon black having a high electric conductivity is incorporated in the first magnetic layer to prevent electrification property, and carbon black having a large particle size is incorporated in the second magnetic layer to reduce the coefficient of friction.

The carbon black which can be used in the present invention are described, for example, in *Carbon Black Binran* (Handbook of Carbon Black) edited by Carbon Black Association, Japan (1971). Abrasive agents which can be used in the present invention include known materials having a Mohs' hardness of at least 6 such as α-alumina having an α-conversion ratio of 90% or more, β-alumina, silicon carbide, chromium oxide, cerium oxide, α-iron oxide, corundum, artificial diamond, silicon nitride, silicon carbide, titanium carbide, titanium oxide, silicon dioxide and boron nitride. These abrasives can be used alone or in combination. Composite materials (obtained by surface treatment of abrasive agents with other abrasive agents) composed of these abrasive agents may also be used. In some cases, these abrasive agents contain some extraneous compounds or elements other than the main abrasive components. However, the effect is unchanged as long as the main abrasive components are contained in an amount of 90% or more.

It is preferred that these abrasive agents have a particle size of 0.01 to 2 μm. However, the abrasive agents different in particle size may be combined with one another, if desired, or the particle size distribution of a single abrasive agent may be widened to obtain a similar effect. It is preferred that the abrasive agents have a tap density of 0.3 to 2 g/cc, a water content of 0.1 to 5%, a pH of 2 to 11 and a specific surface area of 1 to 30 m$^2$/g.

The shape of the abrasive agents used in the present invention may be any of acicular, spherical and die-like forms, but a shape having an edge is preferred because of the high abrasive ability afforded.

Specific examples of the abrasive agents used in the present invention include AKP-20, AKP-30, AKP-50 and HIT-50 (manufactured by Sumitomo Chemical Co., Ltd.); G5, G7 and S-1 (manufactured by Nippon Chemical Industrial Co., Ltd.); and 100ED and 140ED (manufactured by Toda Kogyo Co., Ltd.).

It is of course possible that the abrasive agents are appropriately used differently in the first magnetic layer and the second magnetic layer by changing the kind, amount and combination of the abrasive agents according to the purpose sought. For example, in order to improve the durability of the major surfaces of the magnetic layer structure, the amount of the abrasive agent contained in the second magnetic layer is increased, and in order to improve the durability of the edge surfaces of the magnetic layer structure, the amount of the abrasive agent contained in the first magnetic layer is increased.

Also, these abrasive agents can be previously dispersed with binders, followed by addition to magnetic coating compositions.

It is preferred that the major surfaces and the edge surfaces of the magnetic layer structure of the magnetic recording medium of the present invention contain the abrasive agent in an amount of at least 5 particles/100 μm$^2$.

In the present invention, additives having lubricating effect, antistatic effect, dispersing effect, plasticizing effect or the like may be added to the magnetic layers. Examples of such additives include molybdenum disulfide, tungsten disulfide, graphite, boron nitride, fluorinated graphite, silicone oil, silicones having polar groups, fatty acid-modified silicones, fluorine-containing silicones, fluorine-containing alcohols, fluorine-containing esters, polyolefins, polyglycols, alkyl phosphates and alkaline metal salts thereof, alkyl sulfates and alkaline metal salts thereof, polyphenyl ethers, fluorine-containing alkyl sulfates and alkaline metal salts thereof, monobasic fatty acids having 10 to 24 carbon atoms (which may contain unsaturated bonds or may be branched) and metal salts thereof (such as Li, Na, K and Cu), monovalent, divalent, trivalent, tetravalent, pentavalent and hexavalent alcohols having 12 to 22 carbon atoms (which may contain unsaturated bonds or may be branched), alkoxy alcohols having 12 to 22 carbon atoms, mono-, di- and tri-esters of monobasic fatty acids having 10 to 24 carbon atoms (which may contain unsaturated bonds or may be branched) and one of monovalent, divalent, trivalent, tetravalent, pentavalent and hexavalent alcohols having 2 to 12 carbon atoms (which may contain unsaturated bonds or may be branched), fatty acid esters of monoalkyl ethers of alkylene oxide polymers, fatty acid amides having 8 to 22 carbon atoms and fatty acid amines having 8 to 22 carbon atoms. Specific examples of these compounds include lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol and lauryl alcohol.

In addition, there can also be used nonionic surface active agents such as alkylene oxides, glycerin compounds, glycidol compounds and alkylphenol-ethylene oxide adducts; cationic surface active agents such as cyclic amines, ester amides, quaternary ammonium salts, hydantoin derivatives, heterocyclic compounds, phosphonium compounds and sulfonium compounds; anionic surface active agents containing acidic groups such as carboxylic acid groups, sulfonic acid groups, phosphoric acid groups, sulfate groups and phosphate groups; and amphoteric surface active agents such as amino acids, aminosulfonic acids, sulfates or phosphates of aminoalcohols and alkylbetaines. These surface active agents are described in detail in *Kaimen Kasseizai Binran* (Handbook of Surface Active Agents) published by Sangyo Tosho Co., Ltd., Japan (1960)).

These lubricants and antistatic agents do not necessarily have a purity of 100%, and may further contain impurities such as isomers, unreacted materials, by-products, decomposed products and oxidation products other than the main components. The content of these impurities contained in the lubricants and antistatic agents is preferably 30% or less, and more preferably 10% or less.

It is possible that these lubricants and surface active agents are properly used differently in the first magnetic layer and the second magnetic layer by changing the kind and amount thereof, if necessary. For example, the following methods are applicable in this regard.

(1) Fatty acids different in melting point are used in the first magnetic layer and the second magnetic layer, respectively, to control their bleeding to the surface.

(2) Esters different in boiling point or in polarity are used in the first magnetic layer and the second magnetic layer, respectively, to control their bleeding to the surface.

(3) The amount of the surface active agent is adjusted to improve the stability of coating.

(4) The amount of the lubricant to the ferromagnetic powder is increased in the first magnetic layer to improve lubricating effect.

The use of the lubricants and the surface active agents is of course not limited to the examples shown above.

All or a part of the additives used in the present invention can be added in any step of the magnetic coating production. For example, they can be mixed with the ferromagnetic powder before a kneading step, or can be added during the kneading step of the ferromagnetic powder, the binder and the solvent, during a dispersing step, after the dispersing step, or immediately before a coating step.

Examples of commercial products of these lubricants include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, castor oil-hardened fatty acids, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monogly MB, Nonion DS-60, Anon BF, Anon LG, butyl stearate, butyl laurate and erucic acid (manufactured by Nippon Oil and Fats Co., Ltd.); oleic acid (manufactured by Kanto Kagaku Co., Ltd.); FAL-205 and FAL-123 (manufactured by Takemoto Yushi Co., Ltd.); Enujerubu LO, Enujerubu IPM and Sansosyzer E4030 (manufactured by Shin-Nippon Rika Co., Ltd.); TA-3, KF-96, KF-96L, KF96H, KF410, KF420, KF965, KF54, KF50, KF56, KF907, KF851, X-22-819, X-22-822, KF905, KF700, KF393, KF-857, KF-860, KF-865, X-22-980, KF-101, KF-102, KF-103, X-22-3710, X-22-3715, KF-910 and KF-3935 (manufactured by Shinetsu Chemical Co., Ltd.); Armide P, Armide C and Armoslip CP (manufactured by Lion Ahmer Co.); Duomine TDO (manufactured by Lion Corp.); BA-41G (manufactured by Nisshin Seiyu Co., Ltd.); and Profan 2012E, Newpole PE61, Ionet MS-400, Ionet MO-200, Ionet DL-200, Ionet DS-300, Ionet DS-1000 and Ionet DO-2000 (manufactured by Sanyo Chemical Industries, Ltd.).

Organic solvents used in the coating compositions in the present invention include ketones such as acetone, methyl ethyl ketone, methyl isobutyl ketone, diisobutyl ketone, cyclohexanone, isophorone and tetrahydrofuran; alcohols such as methanol, ethanol, propanol, butanol, isobutyl alcohol, isopropyl alcohol and methylcyclohexanol; esters such as methyl acetate, butyl acetate, isobutyl acetate, isopropyl acetate, ethyl lactate and glycol acetate; glycol ethers such as glycol dimethyl ether, glycol monoethyl ether and dioxane; aromatic hydrocarbons such as benzene, toluene, xylene, cresol and chlorobenzene; chlorinated hydrocarbons such as methylene chloride, ethylene chloride, carbon tetrachloride, chloroform, ethylene chlorohydrin and dichlorobenzene; N,N-dimethylformamide; and hexane. These solvents may be used in any appropriate proportions.

These organic solvents do not necessarily have a purity of 100%, and may contain impurities such as isomers, unreacted materials, by-products, decomposed products, oxidation products and water other than the main components. The content of these impurities contained in the solvents is preferably 30% by weight or less, and more preferably 10% by weight or less.

The organic solvent used in the first magnetic layer may be different from that used in the second magnetic layer in kind and amount thereof. For example, the highly volatile solvent is used in the first magnetic layer to improve surface properties, the solvent having high surface tension (such as cyclohexane or dioxane) is used in the first magnetic layer to improve coating stability, or the solvent having a high solubility parameter is used in the second magnetic layer to increase the packing degree. The use of the solvents is of course not limited to these examples.

In the magnetic recording medium of the present invention, the thickness of the non-magnetic support is generally 1 to 100 μm, and preferably 6 to 20 μm.

Between the non-magnetic support and the first magnetic layer may be formed an interlayer such as an subbing layer to improve adhesion property or a layer containing carbon black to prevent electrification property. The thickness of the interlayer is generally 0.01 to 2 μm, and preferably 0.05 to 0.5 μm. A backing layer may be formed on the surface opposite to the magnetic layer side of the non-magnetic support. The thickness of the backing layer is generally 0.1 to 2 μm, and preferably 0.3 to 1.0 μm. As the interlayer and the backing layer, conventional materials can be used.

Examples of the non-magnetic supports used in the present invention include known films formed of polyesters such as polyethylene terephthalate and polyethylene naphthalate, polyolefins, cellulose triacetate, polycarbonates, polyamides, polyimides, polyamideimides or polysulfones. These supports may previously be subjected to corona discharge treatment, plasma treatment, adhesion treatment, heating treatment, dust removing treatment or the like. In order to attain the object of the present invention, it is preferred to use the non-magnetic support having a center line average height of generally not more than 0.03 μm, preferably not more than 0.02 μm, and more preferably not more than 0.01 μm. It is further preferred that the non-magnetic support not only is low in center line average height, but also has no large projections of 1 μm or more. The roughness and shape of the surface of the support are freely controlled by adjusting the size and amount of a filler added thereto as needed. Examples of such fillers include finely divided organic substances such as acrylic compounds, as well as oxides and carbonates of Ca, Si, Ti and the like. As to the non-magnetic support used in the present invention, the F-5 value in the running direction of the tape is preferably 5 to 50 kg/mm$^2$, and the F-5 value in the width direction of the support tape is preferably 3 to 30 kg/mm$^2$. In general, the F-5 value in the running direction of the tape is higher than that in the width direction of the support tape. When the strength in the width direction of the support tape is particularly required to be increased, however, this arrangement does not apply.

Further, the heat shrinkage rate in the running and width directions of the support tape at 100° C. for 30 minutes is preferably 3% or less, and more preferably 1.5% or less. The heat shrinkage rate at 80° C. for 30 minutes is preferably 1% or less, and more preferably 0.5% or less. The breaking strength in both directions of the support tape is preferably 5 to 100 kg/mm$^2$, and the modulus is preferably 100 to 200 kg/mm$^2$.

The production process of the magnetic coating used for the magnetic recording medium of the present invention comprises at least a kneading step, a dispersing step and mixing steps added before and/or after these steps if desired. Each step may be divided into two or more stages.

All of the starting materials used in the present invention, such as the ferromagnetic powder, the binders, the carbon black, he abrasive materials, the antistatic agents, the lubricants and the solvents, can be added at the start of or during any step. Each of the starting materials can also be added in separate portions over two or more steps. For example, polyurethane can be incorporated in parts in the kneading step, in the dispersing step and in the mixing step for adjustment of viscosity after the dispersing step.

In order to attain the objects of the present invention, conventional production techniques can of course be used as a part of the process. In the kneading step, however, kneaders having strong kneading ability such as continuous kneaders and pressure kneaders are used, whereby the high residual magnetic flux density (Br) of the magnetic recording medium of the present invention can first be obtained.

When the continuous kneader or the pressure kneader is used, all of the binders or a part thereof (30% or more of all of the binders is preferable) are kneaded with the ferromagnetic powder within the range of 15 to 500 parts by weight based on 100 parts by weight of the ferromagnetic powder. The details of such kneading treatment are described in JP-A-1-106338 and JP-A-1-79274. In the magnetic recording medium of the present invention, the second magnetic layer has a thickness of 1.5 μm or less. However, it is substantially impossible to realize such a thickness by the conventional successive plural coating method in which the first magnetic layer is applied and then the second magnetic layer is applied thereon after drying, because coating defects are liable to be produced. In the present invention, it is preferred to use the simultaneous plural-layer coating method as described in JP-A-62-212933 and U.S. Pat. 4,844,946.

In the present invention, the simultaneous plural-layer coating methods are not limited to a coating method by using an extrusion coater which can simultaneously pour plural coating composition, but also include a method in which a coating composition is coated to form one layer, and immediately after that, the next coating composition is coated thereon in a wet state to form the next layer, and a method in which a coating composition is further coated on a lower magnetic layer previously formed to form a magnetic layer while the lower magnetic layer is not dried yet.

In order to obtain the SFD of the second magnetic layer specified in the present invention, it is necessary to highly orient the ferromagnetic powder. It is preferred to use a solenoid of at least 1,000 G in combination with a cobalt magnet of at least 2,000 G, and it is further preferred to provide a suitable drying step before orientation so as to give the highest orientation after drying.

The surface roughness of the magnetic recording medium of the present invention can not be obtained by conventional calender treatment. The desired surface roughness can first be obtained by treating the magnetic recording medium between metal rolls at a high temperature of 80° C. or more under a line pressure of 200 kg/cm or more.

Calender rolls are preferably formed of metal. In some cases, however, even when some of them are formed of heat-resistant plastic resins such as epoxy resins, polyimides, polyamides and polyimideamides, the desired surface roughness can be obtained. The treating temperature is preferably 80° C. or more, and more preferably 100° C. or more. The line pressure is preferably 200 kg/cm or more, and more preferably 300 kg/cm or more.

The coefficient of friction of the magnetic layer surface of the magnetic recording medium of the present invention and the SUS 420J on the opposite side thereof is preferably 0.5 or less, and more preferably 0.3 or less. The surface resistivity is preferably $1 \times 10^{-5}$ to $1 \times 10^{-12}$ ohms/square, and the modulus of the magnetic layer at 0.5% elongation in both the running and width directions of the tape is preferably 100 to 2,000 kg/mm$^2$. The breaking strength is preferably 1 to 30 kg/cm$^2$. The modulus of the magnetic recording medium in both the running and width directions is preferably 100 to 1,500 kg/mm$^2$, and the residual elongation thereof is preferably 0.5% or less. The heat shrinkage rate at all temperatures of 100° C. or less is preferably 1% or less, more preferably 0.5% or less, and most preferably 0.1% or less.

The content of the residual solvents contained in the magnetic layers is preferably 100 mg/m$^2$ or less, and more preferably 10 mg/m$^2$ or less. It is preferred that the content of the residual solvent contained in the second magnetic layer is less than that of the residual solvent contained in the first magnetic layer.

The percentage of pores in both the first and second magnetic layers is preferably 30% by volume or less, and more preferably 10% by volume or less. It is preferred that the percentage of pores in the first magnetic layer is higher than that in the second magnetic layer. However, the percentage of pores in the first magnetic layer may be lower than that in the second magnetic layer, as long as the percentage of pores in the first magnetic layer is also 5% or more.

The magnetic recording medium of the present invention has the first magnetic layer and the second magnetic layer. It is easily presumed that their physical characteristics can be varied between the first magnetic layer and the second magnetic layer depending on the purpose desired. For example, the modulus of the second magnetic layer can be increased to improve the running durability, and at the same time, the modulus of the first magnetic layer can be lowered as compared with that of the second magnetic layer to improve the contact of the magnetic recording medium with a head.

As brought out above, the present invention concerns a magnetic recording medium for audio playback in which the thickness of the second magnetic layer is increased and the ratio (A/B) of the thickness (A) of the first magnetic layer to the thickness (B) of the second magnetic layer is specified to 0.5 to 3.2, thereby improving the MOL 10k. This magnetic recording medium can be prevented from curling by using the simultaneous or sequential wet coating methods, even if the second magnetic layer is relatively thick. Preferably, the binder containing —OH or —COOM groups (wherein M represents hydrogen or an alkaline metal) is added in relatively large amounts to the second magnetic layer, and the binder containing groups having a high dispersibility such as —NR$_4$X (R and X as defined above), for example, —N(CH$_3$)$_3$Cl, is added in small amounts to the first magnetic layer, whereby a reduction in μ value and the dropping off of the particles can be prevented and the wow and flutter characteristics and the level down of the running properties can be improved.

The present invention will be described in more detail with reference to the following nonlimiting examples and comparative examples, in which all parts are by weight.

EXAMPLE AND COMPARATIVE EXAMPLE

| First Magnetic Layer (Lower layer) | |
|---|---|
| Cobalt-modified iron oxide | 100 parts |
| (Hc: 350 Oe, specific surface area: 25 m$^2$/g, crystallite size: 450 angstroms, particle size (length in the long axis): 0.30 μm, acicular ratio: 10) | |
| Vinyl chloride-vinyl acetate-vinyl alcohol copolymer | X1 parts |
| (composition ratio: 86:13:1, degree of polymerization: 400, functional group: containing —N(CH$_3$)$_3$Cl) | |
| Polyester polyurethane resin | Y1 parts |
| Carbon black | 2 parts |
| (particle size: 0.05 μm) | |

-continued

| | |
|---|---|
| α-Alumina | 3 parts |
| Myristic acid-modified silicone | 1 part |
| Stearic acid | 2 parts |
| Butyl acetate | 200 parts |
| Second Magnetic Layer (Upper layer) | |
| Cobalt-modified iron oxide | 100 parts |
| (Hc: 500 Oe, specific surface area: 35 m$^2$/g, crystallite size: 350 angstroms, particle size (length in the long axis): 0.20 μm, acicular ratio: 12) | |
| Vinyl chloride-vinyl acetate-vinyl alcohol copolymer (composition ratio: 86:13:1, degree of polymerization: 400) | X2 parts |
| Polyester polyurethane resin (carboxyl group content: 10$^{-4}$ mol/g) | Y2 parts |
| α-Alumina (particle size: 0.3 μm) | 3 parts |
| Carbon black (particle size: 0.10 μm) | 4 parts |
| Oleic acid-modified silicone | 1 part |
| Stearic acid | 2 parts |
| Butyl acetate | 200 parts |

With respect to each of the two magnetic layer coatings described above, the components were kneaded with a continuous kneader, and then dispersed by using a sand mill. Z1 parts of a polyisocyanate was added to the resulting dispersion for the first magnetic layer, and Z2 parts thereof to the dispersion for the second magnetic layer. Further, 40 parts of butyl acetate was added to each of the dispersions, followed by filtration using a filter having an average pore size of 1 μm to prepare coating compositions for the first magnetic layer and the second magnetic layer, respectively.

The resulting coating composition for the first magnetic layer was applied to a 12 μm-thick polyethylene terephthalate support having a center line average height of 0.02 μm so as to form a first magnetic layer having a thickness of 3.0 μm after drying. Immediately after that, the coating composition for the second magnetic layer was simultaneously applied thereto so as to form a second magnetic layer having a thickness of 2.0 μm after drying. Orientation was thereafter conducted by a cobalt magnet having a magnetic force of 3,000 G and a solenoid having a magnetic force of 1,500 G while both the layers were still in a wet condition. After drying, supercalender treatment was conducted by using a seven-step calender constituted by metal rolls at a temperature of 90° C., followed by slitting to a width of 3.8 mm to produce an compact audio tape.

In the above-described examples, the ratio of the binder components contained in the first magnetic layer was Y1:X1:Z1b =60:30:10, and the ratio of the binder components contained in the second magnetic layer was Y2:X2:Z2=60:20:20. The results of experiments based on the examples and comparative examples are shown in Table 1.

EVALUATION METHODS

Method for Measuring Wow and Flutter

A sine wave of 3 kHz was previously recorded at −20 dB (OVU) with an audio cassette deck (TC-K555ESR, manufactured by SONY Corp.), and then sound reproducing was repeated 20 cycles at 25° C. at 60% RH with a headphone stereo (WM-701C, manufactured by SONY Corp.). The wow and flutter value and the speed variation value during that period were measured with a wow and flutter meter (VP7751A, manufactured by Matsushita Communication Industrial Co., Ltd.).

Method for Measuring Level Down after Running

A sample was run on 10 audio cassette decks (TC-K55ESR, manufactured by SONY Corp.) in the atmosphere of 25° C. and 60% RH for 100 passes. During that period, the output variation was measured, and the level difference between the output level at the first pass and that at the 100th pass was measured.

Electromagnetic Characteristics

Signals were recorded with an audio cassette deck (Type 582, manufactured by Nakamichi Co., Ltd.), and the MOL 315 and the MOL 10k were measured.

MOL 10k

The saturated output of a 10k Hz signal was examined. The values shown in Table 1 are relative values when the MOL 10k of an audio cassette tape (PS-IX C-60, (manufactured by Fuji Photo Film Co., Ltd.) is taken as 0 dB. An automatic spectrum analyzer (3045A, manufactured by Hewlett Packard Co.) was used for measurement.

Method for Measuring Curling

A tape slitted to a width of 3.8 mm was placed the magnetic layer side up on a flat plate, and the height of a tape edge was visually determined to evaluate curling amount in three grades of 1 (none), 2 (medium) and 3 (significant).

TABLE 1

| | Sample No. | | | |
|---|---|---|---|---|
| | 1 | 2 | 3 | 4 |
| Binder amount of first magnetic layer (part by weight) (X1 + Y1 + Z1) | 18 | 18 | 27 | 10 |
| Binder amount of second magnetic layer (part by weight) (X2 + Y2 + Z2) | 19 | 28 | 30 | 14 |
| Difference in binder amount between first and second magnetic layers | 1 | 10 | 3 | 4 |
| Thickness of first magnetic layer: A (μm) | 3 | 3 | 3 | 3 |
| Thickness of second magnetic layer: B (μm) | 2 | 2 | 2 | 2 |
| A/B | 1.5 | 1.5 | 1.5 | 1.5 |
| Wow and flutter (%) | 0.02 | 0.18 | 0.15 | 0.22 |
| Level down after running (dB) | −1 | −0.5 | 0 | −2 |
| Curling | none | none | none | none |
| MOL 10k (dB) | 1.4 | 0.9 | 0.7 | 2 |

| | Sample No. | | | |
|---|---|---|---|---|
| | 5 | 6 | 7 | 8 |
| Binder amount of first magnetic layer (part by weight) | 18 | 18 | 18 | 18 |
| Binder amount of second magnetic layer (part by weight) | 22 | 22 | 14 | 30 |
| Difference in binder amount between first | 4 | 4 | −2 | 12 |

TABLE 1-continued

| and second magnetic layers | | | | |
|---|---|---|---|---|
| Thickness of first magnetic layer: A (μm) | 1.6 | 3.8 | 3 | 3 |
| Thickness of second magnetic layer: B (μm) | 3.0 | 1.2 | 2 | 2 |
| A/B | 0.53 | 3.17 | 1.5 | 1.5 |
| Wow and flutter (%) | 0.18 | 0.18 | 0.9 | 0.18 |
| Level down after running (dB) | −0.6 | −0.3 | −6 | −0.5 |
| Curling | none | none | none | significant |
| MOL 10k (dB) | 2 | 1.4 | 1.2 | −1.5 |

| | Sample No. | | | |
|---|---|---|---|---|
| | 9 | 10 | 11 | 12 |
| Binder amount of first magnetic layer (part by weight) | 29 | 7 | 24 | 18 |
| Binder amount of second magnetic layer (part by weight) | 30 | 14 | 34 | 22 |
| Difference in binder amount between first and second magnetic layers | 1 | 7 | 10 | 4 |
| Thickness of first magnetic layer: A (μm) | 3 | 3 | 3 | 1.5 |
| Thickness of second magnetic layer: B (μm) | 2 | 2 | 2 | 3.5 |
| A/B | 1.5 | 1.5 | 1.5 | 0.4 |
| Wow and flutter (%) | 0.16 | 0.25 | 0.15 | 0.2 |
| Level down after running (dB) | 0 | −11 | 0.2 | −8 |
| Curling | none | none | none | significant |
| MOL 10k (dB) | −0.8 | 2 | −1 | 2.1 |

| | Sample No. | | |
|---|---|---|---|
| | 13 | 14 | 15 |
| Binder amount of first magnetic layer (part by weight) | 18 | 18 | 20 |
| Binder amount of second magnetic layer (part by weight) | 22 | 22 | 24 |
| Difference in binder amount between first and second magnetic layers | 4 | 4 | 4 |
| Thickness of first magnetic layer: A (μm) | 4 | 3 | 3.0 |
| Thickness of second magnetic layer: B (μm) | 1 | 2 | 0.7 |
| A/B | 4 | 1.5 | 4.3 |
| Wow and flutter (%) | 0.16 | 0.2 | 0.15 |
| Level down after running (dB) | −0.6 | −20 | −0.5 |
| Curling | none | significant | none |
| MOL 10k (dB) | −2.5 | 1.5 | −3.8 |

Note:
All samples other than Sample No. 14 were produced by the simultaneous plural-layer coating method, and Sample No. 14 was produced by the sequential coating method.

As apparent from the results shown in Table 1, Sample Nos. 1 to 6 according to the present invention are improved in wow and flutter, level down after running, curling and MOL 0k. However, for Sample Nos. 7 to 15 which are comparative examples, satisfactory results were not obtained.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a non-magnetic support having at least two magnetic layers formed thereon, said at least two magnetic layers being formed by providing, in sequence, a first magnetic layer containing first ferromagnetic powder and a first binder on a surface of the non-magnetic support and then providing a second magnetic layer containing a second binder and second ferromagnetic powder while said first layer is in a wet state, said first magnetic layer containing said first binder in an amount of 10 to 27 parts by weight based on 100 parts by weight of said first ferromagnetic powder, wherein said first binder contains $-N^{\oplus}R_3X^{\ominus}$, $-SO_3M$, $-OSO_3M$, $-PO_3M_2$ or $-OPO_3M_2$ wherein R represents an alkyl group, $X^{\triangle}$ represents an anion, and M represents hydrogen or an alkaline metal, said second magnetic layer containing said second binder in an amount of 14 to 30 parts by weight based on 100 parts by weight of said second ferromagnetic powder wherein said second binder contains a $-OH$ or $-COOM$ group wherein M represents hydrogen or an alkaline metal, the amount of said first binder contained in said first magnetic layer being smaller than that of said second binder contained in said second magnetic layer with a difference therebetween being from 0.5 to 10 parts by weight, and a ratio (A/B) of a dry thickness (A) of said first magnetic layer to a dry thickness (B) of said second magnetic layer being from 0.5 to 3.2.

2. A magnetic recording medium as claimed in claim 1, wherein said dry thickness (A) of said first magnetic layer is 1.5 to 5 μm.

3. A magnetic recording medium as claimed in claim 1, wherein said dry thickness (B) of said second magnetic layer is 1.5 to 2.6 μm.

4. A magnetic recording medium as claimed in claim 1, wherein said first ferromagnetic powder contained in said first magnetic layer has a specific surface are of 50 m²/g or less which is measured by the BET method and a crystallite size of 200 Å or more.

5. A magnetic recording medium as claimed in claim 1, wherein said second ferromagnetic powder contained in said second magnetic layer has a specific surface area of 25 to 80 m²/g which is measured by the BET method and a crystallite size of 450 to 100 Å.

6. A magnetic recording medium as claimed in claim 1, wherein said first binder used in said first magnetic layer contains vinyl chloride or vinyl acetate, and $-NR_3X$ as a polar group wherein R represents an alkyl group or hydrogen and X represents an anion.

7. A magnetic recording medium as claimed in claim 1, wherein Co-modified $\gamma$-$Fe_2O_3$ having a coercive force (Hc) of 400 to 900 Oe is used as said second ferromagnetic powder and $\gamma Fe_2O_3$ or Co-modified $\gamma Fe_2O_3$ having an Hc of 300 to 700 Oe is used as said first ferromagnetic powder, and said second ferromagnetic powder is higher in Hc than said first ferromagnetic powder, and the difference in Hc therebetween is 100 to 300 Oe.

8. A magnetic recording medium as claimed in claim 1, wherein said second magnetic layer has a residual magnetic flux density Br of 1,500 to 2,500 gausses, said first magnetic layer has a Br of 1,700 to 2,800 gausses, said first magnetic layer is higher in Br than said second magnetic layer, and the difference in Br therebetween is 200 to 600 gausses.

9. A magnetic recording medium as claimed in claim 1, wherein an amount of carbon black contained in said first magnetic layer is not more than 10 parts by weight based on 100 parts by weight of said first ferromagnetic powder contained in said first magnetic layer, an amount of carbon black contained in said second magnetic layer is at least 0.5 part by weight, said amount of carbon black contained in said second magnetic layer is larger than that contained in said first magnetic layer, and the difference therebetween is 0.5 part by weight or more.

10. A magnetic recording medium as claimed in claim 1, wherein a dry thickness of said second magnetic layer is from 1 to 3 $\mu$m.

* * * * *